(12) United States Patent
Liang et al.

(10) Patent No.: US 10,897,286 B2
(45) Date of Patent: Jan. 19, 2021

(54) ADAPTIVE MU-MIMO BEAMFORMING

(71) Applicants: Ping Liang, Newport Coast, CA (US); Dengkui Zhu, Beijing (CN)

(72) Inventors: Ping Liang, Newport Coast, CA (US); Dengkui Zhu, Beijing (CN)

(73) Assignee: RF DSP Inc., Irvine, CA (US)

( * ) Notice: Subject to any disclaimer, the term of this patent is extended or adjusted under 35 U.S.C. 154(b) by 28 days.

(21) Appl. No.: 16/212,699

(22) Filed: Dec. 7, 2018

(65) Prior Publication Data

US 2019/0181926 A1    Jun. 13, 2019

Related U.S. Application Data

(60) Provisional application No. 62/596,921, filed on Dec. 11, 2017.

(51) Int. Cl.
| | | |
|---|---|---|
| H04B 7/0452 | (2017.01) | |
| H04B 7/06 | (2006.01) | |
| H04W 72/04 | (2009.01) | |
| H04B 17/309 | (2015.01) | |
| H01Q 25/00 | (2006.01) | |
| H04B 17/318 | (2015.01) | |
| H04W 88/02 | (2009.01) | |
| H04W 88/08 | (2009.01) | |

(52) U.S. Cl.
CPC ......... *H04B 7/0452* (2013.01); *H01Q 25/008* (2013.01); *H04B 7/0617* (2013.01); *H04B 17/309* (2015.01); *H04B 17/318* (2015.01); *H04W 72/0446* (2013.01); *H04W 88/02* (2013.01); *H04W 88/08* (2013.01)

(58) Field of Classification Search
None
See application file for complete search history.

(56) References Cited

U.S. PATENT DOCUMENTS

| | | | |
|---|---|---|---|
| 2002/0102950 A1* | 8/2002 | Gore | H04B 7/0874 |
| | | | 455/101 |
| 2018/0034151 A1* | 2/2018 | McCarthy | H01Q 3/24 |
| 2018/0159244 A1* | 6/2018 | Tzuang | H01Q 25/007 |

OTHER PUBLICATIONS

Y. Zeng and R. Zhang, "Millimeter Wave MIMO with Lens Antenna Array: A New Path Division Multiplexing Paradigm," IEEE transaction on Communications, vol. 64, 2016, pp. 1557-1571.

* cited by examiner

*Primary Examiner* — Diane L Lo
(74) *Attorney, Agent, or Firm* — Guosheng Wang; United States Research and Patent Firm (57) ABSTRACT

This invention presents methods and systems for RF path and antenna connection and switch in wireless communication comprising an electromagnetic lens and M antennas; N (N<=M) radio frequency (RF) transmitting and receiving chains/paths that contain Low Noise Amplifiers (LNAs), RF filters, mixers, amplifiers; a plural of digital to analog converters (DACs) and analog to digital converters (ADCs); a connection and switch network that maps the signals from M antennas to N RF paths in the UL or mapping the signals from N RF path to M antennas in the DL, and a processor unit that measures and estimates the receiving signal strength (RSS) or the equivalent metrics on each antenna for each user equipment (UE) based on the received UL reference signals, and drives signals to control the connection and switch network to connect RF paths and antennas for data transmission.

16 Claims, 7 Drawing Sheets

ADAPTIVE MU-MIMO BEAMFORMING

FIELD OF INVENTION

This invention relates generally to methods and apparatus for Multi-User Multiple Input Multiple Output (MU-MIMO) wireless communication system, and more particularly, to using electromagnetic lens and digital beamforming to improve MU-MIMO performance and flexibility.

BACKGROUND

MIMO, especially Multi-User MIMO (MU-MIMO), increases spatial re-use of wireless spectrum. In a wireless communication system, a wireless node with multiple antennas, a network access point or Base Station (all referred to BS hereafter) or a User Equipment (UE), can use beamforming in the downlink (DL) or uplink (UL) to increase the Signal-to-Noise Ratio (SNR) or Signal-to-Interference-plus-Noise Ratio (SINR), hence the data rate, of wireless links. A MU-MIMO BS can beamform to multiple UEs simultaneously in a frequency and time slot, e.g., a Resource Block (RB), i.e., using spatial multiplexing to provide capacity growth without the need of increasing the bandwidth.

In the prior art, analog beamforming can be done using a phase shifting network, e.g., a Butler matrix, or an Electromagnetic Lens (EML) (e.g., see Y. Zeng and R. Zhang, "Millimeter Wave MIMO with Lens Antenna Array: A New Path Division Multiplexing Paradigm," *IEEE transaction on Communications*, vol. 64, 2016, pp. 1557-1571), and digital beamforming can be done using Zero-Forcing (ZF) or conjugate beamforming precoding or other precoding methods. There is also prior art using hybrid beamforming that combines analog beamforming and digital beamforming in which M radio-frequency (RF) paths are used to drive N>M antenna elements through a phase-shifter network. However, there is no prior art that dynamically matches the number of RF paths to the multipath environment of the signals, nor prior art that dynamically selects the multipath directions to apply the M RF paths when N>M.

BRIEF DESCRIPTION OF DRAWINGS

Abbreviations used in the following list of drawings are defined in the next section which provides the detailed description of the embodiments of the invention.

DETAILED DESCRIPTION

Reference may now be made to the drawings wherein like numerals refer to like parts throughout. Exemplary embodiments of the invention may now be described. The exemplary embodiments are provided to illustrate aspects of the invention and should not be construed as limiting the scope of the invention. When the exemplary embodiments are described with reference to block diagrams or flowcharts, each block may represent a method step or an apparatus element for performing the method step. Depending upon the implementation, the corresponding apparatus element may be configured in hardware, software, firmware or combinations thereof.

In the following descriptions, an antenna and a RF path/chain is used interchangeably to indicate a Transmit (Tx) and/or Receive (Rx) RF circuit and an antenna connected to it unless indicated by the context otherwise, for example, in a hybrid beamforming system, one RF path may be connected to multiple antenna elements via an analog or mostly analog beamforming circuit. In such a system, all the antenna elements connected to the same RF path can be treated as a single equivalent antenna in baseband processing. Hereafter, a pilot signal may mean a signal transmitted by one antenna for the purpose of estimating the channel between the transmitting antenna and one or more receiving antennas. It may also be called a reference signal, a channel estimation signal or a test signal.

This invention presents methods and systems for RF path and antenna connection and switch in wireless communication comprising an electromagnetic lens and M antennas; N (N<=M) radio frequency (RF) transmitting and receiving chains/paths that contain Low Noise Amplifiers (LNAs), RF filters, mixers, amplifiers; a plural of digital to analog converters (DACs) and analog to digital converters (ADCs); a connection and switch network that maps the signals from M antennas to N RF paths in the UL or mapping the signals from N RF path to M antennas in the DL, and a processor unit that measures and estimates the receiving signal strength (RSS) or the equivalent metrics on each antenna for each user equipment (UE) based on the received UL reference signals, and drives signals to control the connection and switch network to connect RF paths and antennas for data transmission.

Figure 1:
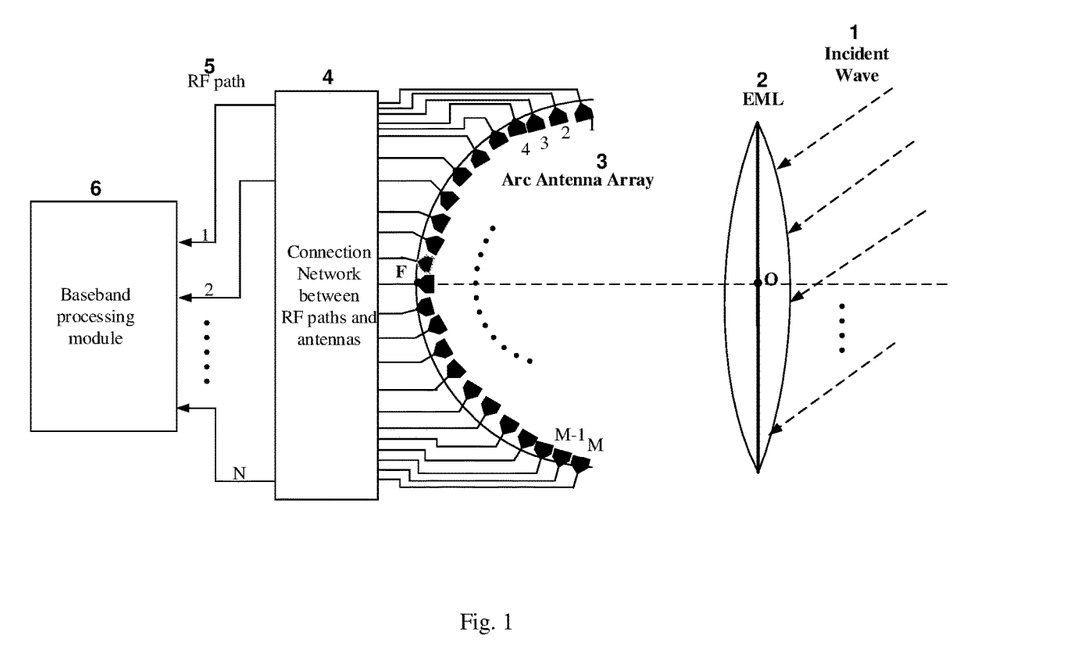
FIG. 1 shows a wireless communication system with an EML before an arc antenna array.

FIG. 1 shows a wireless communication system in the uplink with an EML 2 before an arc antenna array 3, where the N RF paths 5 are connected to the M antenna through a connection and switch network 4. In this system, when transmitting data in the uplink, the incident waves with the same direction 1 are multiplied with different phase factors by the EML 2 and then arrive to the arc antenna array 3, where the signals on these M antennas are mapped to N RF paths 5 by the connection and switch network 4 between the RF paths and the antennas and passed to the baseband processing module 6 for further processing, e.g., signal detection, demodulation and decoding. Because of the limited number of multipath components and the associated angles of arrival (AoAs), and the focusing effect of EML before the antenna array, the received signal strengths (RSSs) on some antennas may be ignorable. Note that in the downlink, the processing symmetric to the uplink is applied.

Figure 2:
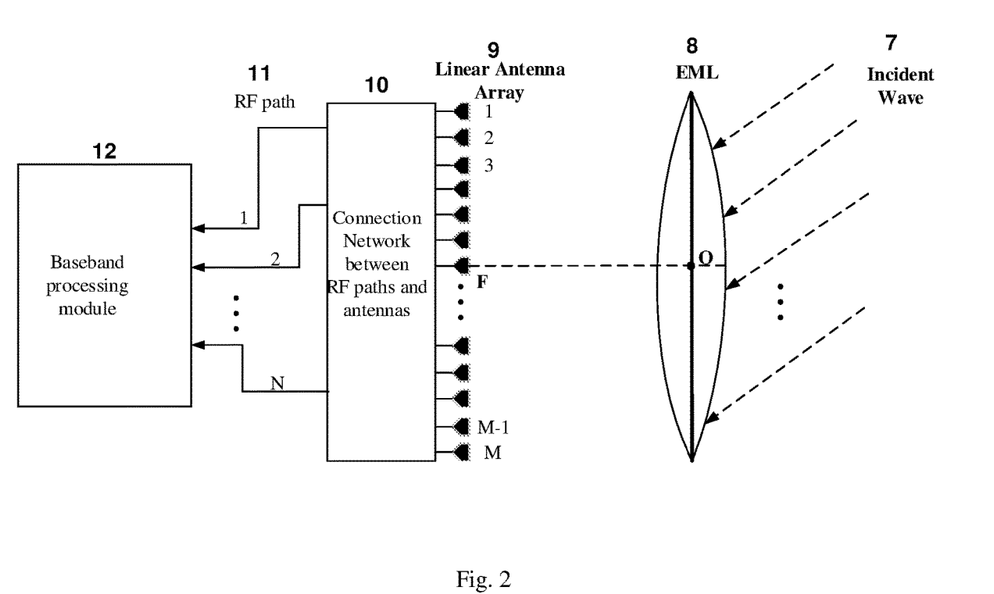
FIG. 2 shows a wireless communication system with an EML before a linear antenna array.

FIG. 2 shows another wireless communication system in the uplink with an EML 8 before a linear antenna array 9, where the N RF paths 11 are connected to the M antennas 9 through a connection network 10. In this system, when transmitting data in the uplink, the incident waves with the same direction 7 are multiplied with different phase factors by the EML 8 and then arrive to the linear antenna array 9, where the signals on these M antennas are mapped to N RF paths 11 by the connection and switch network 10 between the RF paths and the antennas and passed to the baseband processing module 12 for further processing, e.g., signal detection, demodulation and decoding. Note that in the downlink, the processing symmetric to the uplink is applied.

Note that the EML employed in a system can be of different lens types, e.g., spherical lens or planar lens, and the antenna array employed in a system can be two dimensional or even three dimensional, e.g., spherical antenna array, planar antenna array, etc., other than those described in the previous paragraphs.

Considering the relations between N and M and various application scenarios of the wireless communication systems, different connection and switch networks need to be designed to complete the dynamic mapping between the RF paths and the antenna array.

Case 1: N=M

For this case, each antenna element in the array is connected to an independent RF path, e.g., the connection and switch network realizes a one-to-one mapping between antenna elements and RF paths. However, because of the limited number of departure/arrival of angles (DoAs/AoAs) of the signals associated with each UE, after electromagnetic focusing by the EML, only m≤M antenna elements receive/transmit signals with high quality while the rest M−m antennas may receive/transmit significantly lower signals. As a result, to save power consumption, the rest M−m RF paths connected to the M−m antennas are turned off. Specifically, in one embodiment, to adaptively select RF paths transmitting signals in each data transmission time slot, a UE sends UL reference signals in specific time slots. With all the RF paths on the BS turned on and one or more UEs transmitting UL reference signals, the BS collects the RF path indices that have RSS or SNR or other metrics larger than a predefined threshold. Then, in one or more subsequent data transmission time slots in the uplink or downlink with the said one or more UEs, the BS selects m of RF paths that includes the RF paths that have RSS or SNR or other metrics larger than a predefined threshold.

In another embodiment, a set of RF path selection patterns and pattern applications are predefined based on the prior knowledge of UEs' geographic distribution. One scenario is that all UEs are Customer Premise Equipment (CPEs) in fixed wireless access, the channel between the BS and CPEs are line of sight (LoS), and a subset of CPEs are to be served in a given time slot. The CPEs shared the BS throughput in a Time Division Multiple Access (TDMA) scheme, and the BS selects a pre-defined RF path selection at a time and alternate between one or more pre-defined RF path selection patterns, with each pre-defined RF path selection producing a pattern of beams serving a subset of CPEs.

Figure 3:
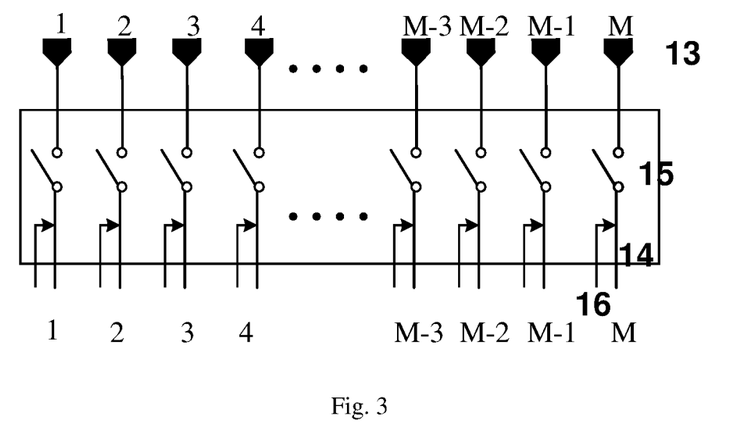
FIG. 3 shows a connection and switch network with full connection.

The RF path selection can be implemented by the connection and switch network module in FIG. 1 and FIG. 2. FIG. 3 shows an example, where each antenna 13 and RF path 14 is connected by a switch 15 that is controlled by the input control signal 16, e.g., the control bit=0 denotes the switch is on and the control bit=1 denotes the switch is off.

Case 2: N<M

For this case, among the M antennas, only the signals of N antennas are passed to the baseband through the N RF paths in the uplink or the signals from the N RF paths are radiated out into the air through a subset of the M antennas. To ensure any N antennas can be selected, each RF path needs to connect to all M antennas, i.e., a full connection and switch network, which is the most flexible but with high connection complexity and high insertion loss.

We present embodiments that avoid the high connection complexity and high insertion loss of full connection and switch network using a partial connection and switch network adapted to the application. In one embodiment, each RF path is connected to M1<M antennas and adaptively controlled switches are used to ensure that one RF path is only connected to at most one of these M1 antennas each time.

Figure 4:
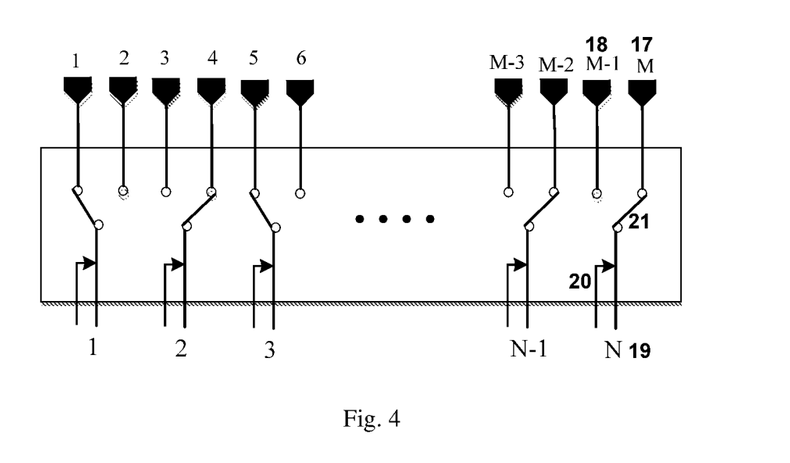
FIG. 4 shows a partial connection with one RF path switching between two neighboring antennas in the array.

One embodiment of partial connection and switch network is that every consecutive integer of M/N antennas are connected to one RF path where one of these antennas is selected each time through an adaptively controlled switch. FIG. 4 shows an example with M/N=2, where every two consecutive antennas 17, 18 and a RF path 19 are dynamically connected by a switch 21 controlled by the input control signal 20, e.g., the control bit=0 denotes switching to the antenna 17 and the control bit=1 denotes switching to the antenna 18.

Figure 5:
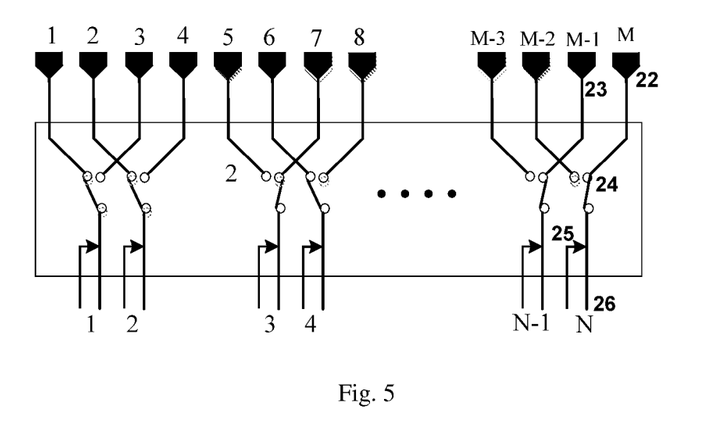
FIG. 5 shows a partial connection with one RF path switching between two non-adjacent antennas in the array.

Since each antenna corresponds to a beam out of the EML and neighboring antennas correspond to immediately adjacent beams that cover immediate neighboring spatial areas. Grouping multiple antennas into the same switch connecting a RF path reduces the angular resolution of the EML antenna system comprising an EML and a connection and switch network. Let the beamwidth of each beam from the EML be D, the angular resolution of the EML antenna system using a connection and switch network that connects a RF path with one of m consecutive immediate neighbor antennas is mD. For example, the angular resolution of the EML antenna system in FIG. 3 is D but the angular resolution of the EML antenna system in FIG. 4 is 2D because only one beam can be available in a 2D beamwidth angle. As m becomes bigger, e.g., m=4 or 8, when multiple UEs are present in a nearby area and requires multiple beams to serve them, the embodiment of using a connection and switch network that connects a RF path with one of m consecutive immediate neighbor antennas cannot meet this need. An embodiment that overcomes this limitation is a partial connection and switch network that interleaves the antenna and RF path connections. It connects each RF path to one or more of M/N antennas that are certain separation away. Multiple RF paths can connect to a group of consecutive immediate neighbor antennas. The embodiment uses adaptively controlled switches to connect p>1 RF paths to p or more consecutive immediate neighbor antennas. FIG. 5 shows an example with M/N=2 and p=2, where every two non-immediate neighbor antennas 22, 23 and a RF path 26 are adaptively and dynamically connected by a switch 24 controlled by a control signal 25, e.g., the control bit=0 denotes switching to antenna 22 and the control bit=1 denotes switching to antenna 23.

In embodiments described in the previous two paragraphs, to complete the adaptive switching between the antennas in a data transmission/reception time slot, the BS measures the signal strength that can be received at each antenna from each UE in advance. Specifically, each UE sends UL reference signals in M/N time slots that are predefined or pre-allocated by the BS, where the switch is connected to a different subset of antennas in each UL reference transmission time slot. The BS measures the RSS or other equivalent metrics. Then, the BS determines which antenna is connected to which RF path in the following data transmission time slot based on the UEs scheduled in that time slot and the RSS level or equivalent metrics on each antenna associated to each scheduled UE.

Table 1 shows the normalized signal energy that is measured by the BS at each antenna for each UE with the UL reference signal, where M=8, N=4, and the total number of UE is 4. Assuming that UE1 and UE 3 are scheduled at the next time slot, then with the criteria for each RF path that the antenna with a larger sum of normalized signal energy is selected, the antennas 2, 4, 5, and 7 are connected to the RF paths 1, 2, 3 and 4 respectively.

Figure 6:
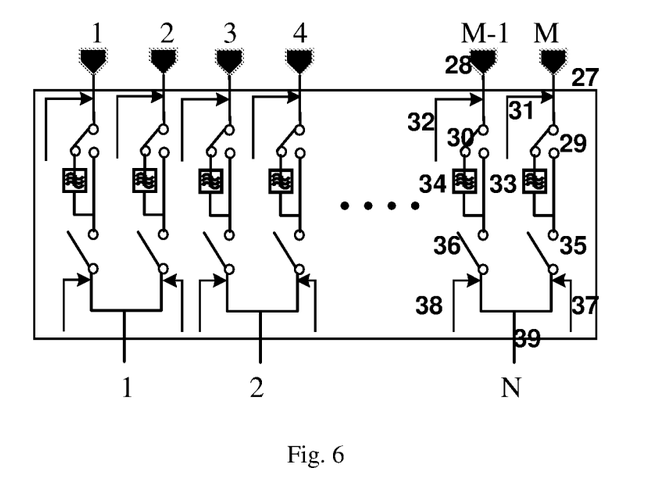
FIG. 6 shows a partial connection with one RF path connecting two neighboring antennas, where each antenna is independent controllable.

Another embodiment of partial connection and switch network is that every consecutive M/N antennas are connected to one RF path where at most one of these antennas is selected each time through an adaptive controlled switch. FIG. 6 shows an example with M/N=2, where every two consecutive antennas 27, 28 and a RF path 39 are dynamically connected. The switches 29 and 30 are used to select between data transmission and UL reference signal transmission, where these two switches are controlled by the two input control signals 31 and 32 respectively. When switches 29 and 30 are switched to UL reference signal transmission, the received signal of antennas 27 and 28 are first passed into the filters 33 and 34 respectively, and the two switches 35 and 36 are turned on. Note that the switches 35 and 36 are used to turn on or off antennas 27 and 28 respectively, where these two switches are controlled by the two input signals 37 and 38 respectively.

Figure 7:
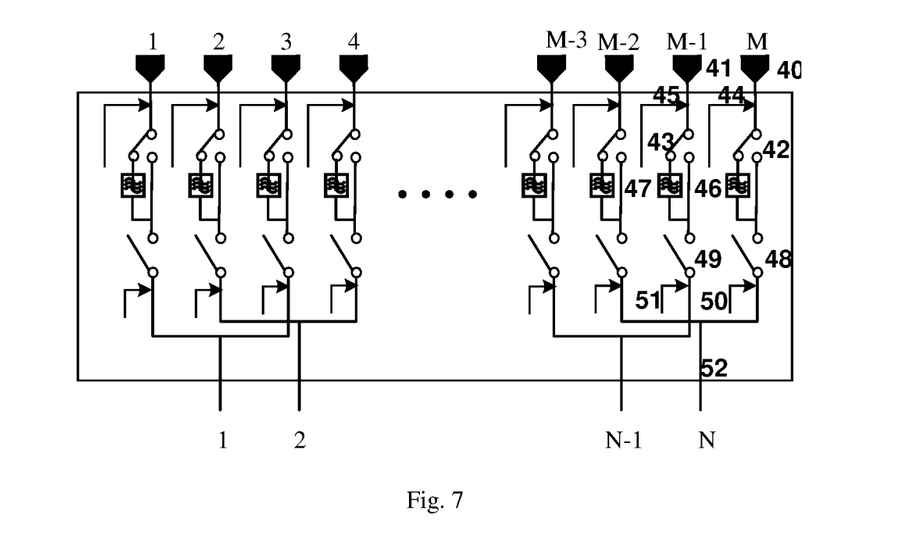
FIG. 7 shows a partial connection with one RF path connecting two non-adjacent antennas, where each antenna is independent controllable.

Another embodiment of partial connection and switch network is that each RF path is connected to M/N antennas that are far apart through an adaptive controlled switch where p>1 RF paths are switched to at most p consecutive antennas. FIG. 7 shows an example with M/N=2 and p=2, where two antennas 40, 41 and a RF path 52 are dynamically connected. The switches 42 and 43 are used to select between data transmission and UL reference signal transmission, where these two switches are controlled by the two input control signals 44 and 45 respectively. When the switches 44 and 45 are switched to UL reference signal transmission, the received signal of antennas 40 and 41 are first passed into the filters 46 and 47 respectively and the two switches 48 and 49 are turned on. Note that the switches 48 and 49 are used to turn on or off antennas 40 and 41 respectively, where these two switches are controlled by the two input signals 50 and 51 respectively.

For embodiments described in the previous two paragraphs, to complete adaptive switching between the two antennas in each data transmission/reception time slot, the BS needs to measure the signal strength that would be received at each antenna for each UE. Specifically, each UE sends UL reference signals in a specified time slot that is predefined or pre-allocated by the BS. At the BS, the switch of each antenna is controlled so that the received signal is first passed into the filter, where the passband frequency of each filter is pre-designed to ensure that it is different from other antennas belonging to the same RF path. With all the antennas connected to a RF path turned on and extracting the received signals associated to each antenna on the frequency band corresponding to the passband frequency of the filter, the BS can estimate the RSS or other equivalent metrics of each UE on each antenna. When transmitting data, the BS determines which antenna is connected to each RF and/or which RF path is turned on/off in the following time slot based on the scheduled UEs and the associated RSS or equivalent metrics on each antenna. With the UL reference signals, Table 2 shows an example of the BS measured equivalent RSS defined as the normalized signal energy at each antenna for each UE, where M=8, N=4, each two antennas with index difference being 2 are connected to a RF path as in FIG. 7, and the total number of UEs is 6. Assuming UE2, UE4 and UE5 are scheduled at the next time slot, with the criteria for each RF path that the antenna with a larger sum of normalized signal energy is selected, the antenna 1, 4, 5, and 8 are connected to the RF paths 1, 2, 3 and 4 respectively. With the UL reference signals, Table 3 shows another example of the BS measured equivalent RSS defined as the indication of whether the RSS is larger than a predefined threshold or not on each antenna for each UE, where M=8, N=4, each two continuous antennas are connected to a RF path as in FIG. 6, and the total number of UEs is 6. Assuming that UE2, UE3 and UE6 are scheduled at the next time slot, with the criteria for each RF path that the antenna with a larger sum of equivalent RSSs is selected, then the antennas 1, 4, and 7 are connected to the RF paths 1, 2 and 4 respectively. Note that if sums of equivalent RSSs associate to several antennas connecting to a same RF path are the same, then any one of these antennas can be selected to connect to the RF path. If the sums of equivalent RSSs associated to all the antennas connecting to a same RF path are all smaller than a predefined threshold, then this RF path is turned off, i.e., all the antennas connecting to the RF path are turned off.

Another partial connection and switch network can be employed, where each RF path is connected to M1<M antennas and adaptively controlled switches are used to ensure that any k (k<M1) of the M1 antennas can be connected to k RF paths if necessary.

Figure 8:
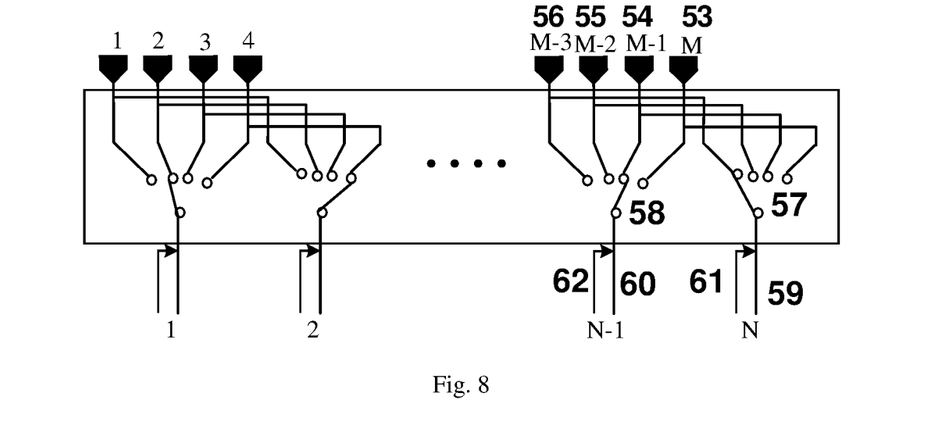
FIG. 8 shows a partial connection with two RF paths switching among four neighboring antennas.

One embodiment of partial connection and switch network is that every k RF paths are connected to K antennas through adaptive controlled switches so that these k RF paths can be switched to any k antennas in these K antennas, i.e., these k RF paths and K antennas are fully connected. FIG. 8 shows an example with k=2 and K=4, where every four continuous antennas 53, 54, 55, 56 and two RF paths 59, 60 are dynamically connected by switches 57, 58 that are controlled by the input control signals 61, 62.

Figure 9:
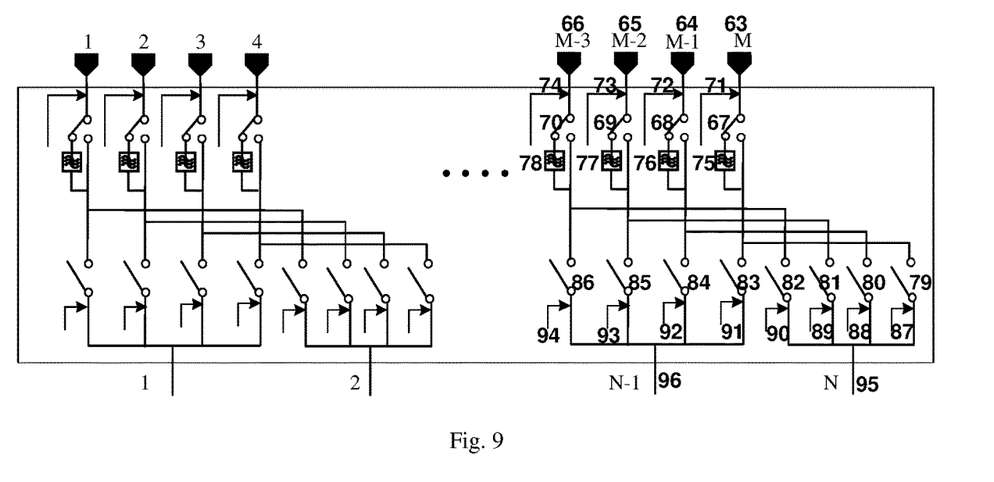
FIG. 9 shows a partial connection with two RF paths switching among four neighboring antennas, where each antenna is independent controllable.

One embodiment of partial connection and switch network is that every k RF paths are connected to K antennas through adaptive controlled switches so that at most k antennas can be turned on to connected to these k RF paths. FIG. 9 shows an example with M/N=2, k=2 and K=4, where each antennas are connected to 2 RF paths through 2 adaptive controlled switches, e.g., the $M^{th}$ antenna 63 is connected to the $(N-1)^{th}$ and $N^{th}$ RF paths 96, 95 through two switches 83, 79; the $(M-1)^{th}$ antenna 64 is connected to the $(N-1)^{th}$ and $N^{th}$ RF paths 96, 95 through two switches 84, 80; the $(M-2)^{th}$ antenna 65 is connected to the $(N-1)^{th}$ and $N^{th}$ RF paths 96, 95 through two switches 85, 81; the $(M-3)^{th}$ antenna 66 is connected to the $(N-1)^{th}$ and $N^{th}$ RF paths 96, 95 through two switches 86, 82. These 8 switches can turn on or off the associated 8 antennas through the 8 input signals, e.g., 87-94 in FIG. 9. On each antenna, a switch is used to control the UL signal reception mode, i.e., switching between normal data transmission and UL reference signal reception, e.g., the input control signals 71-74 control the four switches 67-70 in FIG. 9. When working in UL reference signal reception, the received signal on each antenna is first passed into a filter with a predesigned passband so that there is no overlap among these four passbands associated to the antennas 63-66, where the four filters are denoted by 75-78.

For embodiments described in the previous paragraph, to complete adaptive selecting antennas connecting to a RF path in each data transmission/reception time slot, the BS needs to measure the signal strength that would be received at each antenna for each UE. Specifically, each UE sends UL reference signals in a specified time slot that is predefined or pre-allocated by the BS. At the BS, the received signal of each antenna is first passed into a filter, where the passband frequency of each filter is pre-designed to ensure that it is different from other antennas belonging to the same RF path. With all the antennas connected to a RF path turned on and extracting the received signals associated to each antenna on the frequency band corresponding to the passband frequency of the filter, the BS can estimate the RSS or other equivalent metrics of each UE on each antenna. When transmitting/receiving data signals, the BS determines which antenna is connected to each RF and/or which RF path is turned on/off in the following time slot based on the scheduled UEs and the associated RSS or equivalent metrics on each antenna. With the received UL reference signals, Table 4 shows an example of the BS measured equivalent RSSs defined as the normalized signal energy at each antenna for each UE, where M=8, N=4, each four antennas are connected to two RF paths as in FIG. 9, and the total number of UEs is 6. Assuming UE1, UE3 and UE6 are scheduled at the next time slot, with the criteria for each RF path that the antenna with a larger sum of normalized signal energy is selected, the antenna 3, 4, 6, and 8 are connected to the RF paths 1, 2, 3 and 4 respectively. With the UL reference signals, Table 5 shows another example of the BS measured equivalent RSS defined as the indication of whether the RSS is larger than a predefined threshold or not on each antenna for each UE, where M=8, N=4, each four continuous antennas are connected to two RF paths as in FIG. 9, and the total number of UEs is 6. Assuming that UE1, UE 3 and UE6 are scheduled at the next time slot, with the criteria for each RF path that the antenna with a larger sum of equivalent RSSs selected, then the antennas 3, 4, 7 and 8 are connected to the RF paths 1 and 2 respectively. Note that if sums of equivalent RSSs associated to several antennas connecting to a same RF path are the same, then any two of these antennas can be selected to connect to the two RF paths. If the sums of equivalent RSSs associated to all the antennas connecting to a same RF path are all zero, then these two RF paths are turned off, i.e., all the antennas connecting to the RF paths are turned off.

Figure 10:
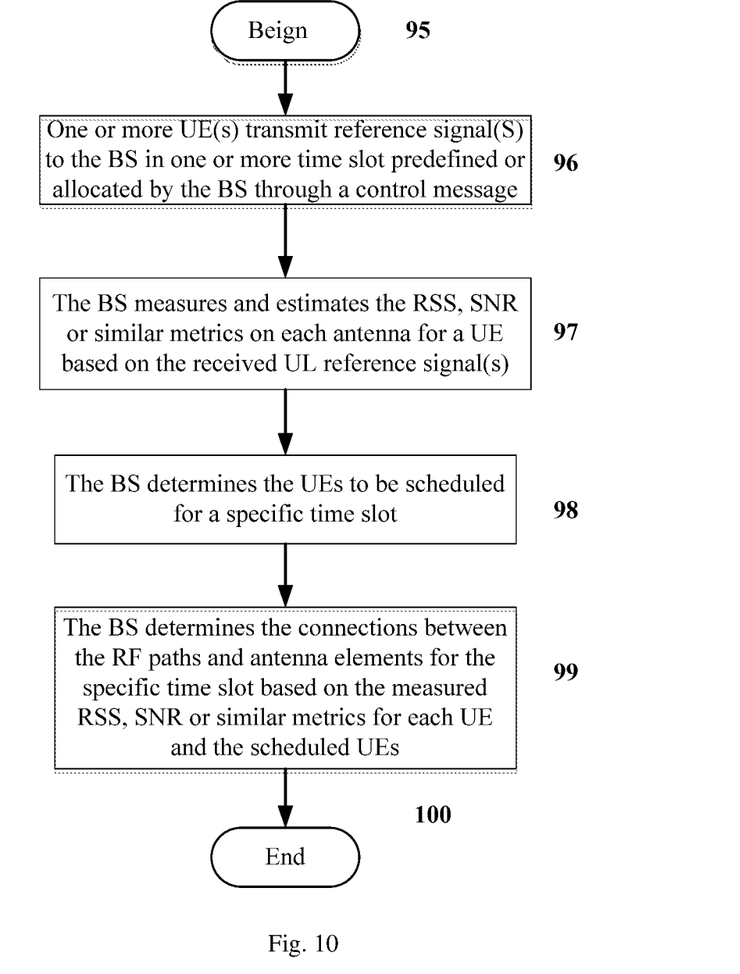
FIG. 10 shows the process of determining the connections between the RF paths and antennas for a specific time slot.

One embodiment of BS determines the connections between the RF paths and antennas are shown in FIG. 10. It begins 95 when a UE transmits reference signals in a time slot predefined or allocated by the BS in the UL 96. After received these signals, the BS measures and estimates the RSS or other equivalent metrics for this UE 97. For a specific time slot, the BS first determines the UEs to be scheduled 98, and then determines the connections between the RF paths and antennas for the next time slot based on the measured RSS or other equivalent metrics for each UE and the scheduled UEs 99. After that, the process of determining the connection between the RF paths and antennas for a specific time slot comes to the end 100.

Although the foregoing descriptions of the preferred embodiments of the present inventions have shown, described, or illustrated the fundamental novel features or principles of the inventions, it is understood that various omissions, substitutions, and changes in the form of the detail of the methods, elements or apparatuses as illustrated, as well as the uses thereof, may be made by those skilled in the art without departing from the spirit of the present inventions. Hence, the scope of the present inventions should not be limited to the foregoing descriptions. Rather, the principles of the inventions may be applied to a wide range of methods, systems, and apparatuses, to achieve the advantages described herein and to achieve other advantages or to satisfy other objectives as well.

TABLE 1

| Normalized signal energy | Ant. 1 | Ant. 2 | Ant. 3 | Ant. 4 | Ant. 5 | Ant. 6 | Ant. 7 | Ant. 8 |
|---|---|---|---|---|---|---|---|---|
| UE1 | 0.0856 | 0.3114 | 0.1521 | 0.0344 | 0.0798 | 0.1449 | 0.1810 | 0.0108 |
| UE2 | 0.0661 | 0.0874 | 0.0856 | 0.2367 | 0.0082 | 0.0451 | 0.1718 | 0.2992 |
| UE3 | 0.1659 | 0.1292 | 0.0116 | 0.1816 | 0.1665 | 0.0010 | 0.2292 | 0.1151 |
| UE4 | 0.0616 | 0.0374 | 0.1852 | 0.1805 | 0.0054 | 0.0916 | 0.1824 | 0.2559 |

TABLE 2

| Normalized signal energy | Ant. 1 | Ant. 2 | Ant. 3 | Ant. 4 | Ant. 5 | Ant. 6 | Ant. 7 | Ant. 8 |
|---|---|---|---|---|---|---|---|---|
| UE1 | 0.0118 | 0.2047 | 0.1019 | 0.1457 | 0.3225 | 0.0845 | 0.1026 | 0.0264 |
| UE2 | 0.1315 | 0.1132 | 0.2075 | 0.2104 | 0.0722 | 0.0262 | 0.0290 | 0.2100 |
| UE3 | 0.0598 | 0.0406 | 0.3258 | 0.1651 | 0.1430 | 0.1714 | 0.0500 | 0.0443 |
| UE4 | 0.1750 | 0.1723 | 0.0157 | 0.1084 | 0.3880 | 0.1001 | 0.0281 | 0.0124 |
| UE5 | 0.2825 | 0.0641 | 0.2623 | 0.1228 | 0.1298 | 0.0146 | 0.0796 | 0.0444 |
| UE6 | 0.0744 | 0.0607 | 0.0916 | 0.2122 | 0.0241 | 0.2650 | 0.1041 | 0.1679 |

TABLE 3

| Normalized signal energy | Ant. 1 | Ant. 2 | Ant. 3 | Ant. 4 | Ant. 5 | Ant. 6 | Ant. 7 | Ant. 8 |
|---|---|---|---|---|---|---|---|---|
| UE1 | 1 | 0 | 0 | 0 | 0 | 0 | 1 | 1 |
| UE2 | 0 | 0 | 0 | 1 | 0 | 0 | 1 | 0 |
| UE3 | 1 | 0 | 1 | 0 | 0 | 0 | 1 | 0 |
| UE4 | 1 | 0 | 0 | 1 | 0 | 0 | 1 | 0 |
| UE5 | 1 | 0 | 0 | 1 | 0 | 0 | 0 | 0 |
| UE6 | 0 | 0 | 1 | 1 | 0 | 0 | 0 | 1 |

TABLE 4

| Normalized signal energy | Ant. 1 | Ant. 2 | Ant. 3 | Ant. 4 | Ant. 5 | Ant. 6 | Ant. 7 | Ant. 8 |
|---|---|---|---|---|---|---|---|---|
| UE1 | 0.0681 | 0.2323 | 0.2861 | 0.1092 | 0.0404 | 0.1656 | 0.0549 | 0.0434 |
| UE2 | 0.2876 | 0.2226 | 0.1085 | 0.2439 | 0.0583 | 0.0051 | 0.0575 | 0.0165 |
| UE3 | 0.0143 | 0.1719 | 0.1626 | 0.1635 | 0.0775 | 0.1393 | 0.0828 | 0.1881 |
| UE4 | 0.0862 | 0.1825 | 0.1282 | 0.0535 | 0.0518 | 0.1388 | 0.1567 | 0.2023 |
| UE5 | 0.1025 | 0.0777 | 0.2825 | 0.1380 | 0.0312 | 0.0724 | 0.1315 | 0.1642 |
| UE6 | 0.0744 | 0.0607 | 0.0916 | 0.2122 | 0.0241 | 0.2650 | 0.1041 | 0.1679 |

TABLE 5

| Normalized signal energy | Ant. 1 | Ant. 2 | Ant. 3 | Ant. 4 | Ant. 5 | Ant. 6 | Ant. 7 | Ant. 8 |
|---|---|---|---|---|---|---|---|---|
| UE1 | 0 | 0 | 1 | 1 | 0 | 0 | 0 | 1 |
| UE2 | 1 | 1 | 0 | 1 | 1 | 0 | 0 | 0 |
| UE3 | 1 | 0 | 1 | 0 | 0 | 0 | 1 | 0 |
| UE4 | 0 | 1 | 0 | 0 | 1 | 1 | 1 | 0 |
| UE5 | 1 | 0 | 0 | 0 | 0 | 1 | 0 | 1 |
| UE6 | 0 | 1 | 0 | 1 | 0 | 0 | 0 | 0 |

We claimed:

1. A base station (BS) for wireless communication comprising
   an electromagnetic lens (EML) that produces different phase factors to uplink (UL) incident waves from the same direction;
   M antennas that receive and/or transmit signals that pass through the EML wherein the angles of arrival and/or departure of one or more User Equipment (UE) are mapped to a subset of m antennas with m≤M;
   N (N<M) radio frequency (RF) paths for transmitting and/or receiving;
   a connection and switch network that adaptively connects a selected set of the M antennas to the N RF paths in the uplink (UL) or adaptively connects the N RF path to a selected set of the M antennas in the downlink (DL); and,
   a processor unit that measures or estimates a receiving signal strength (RSS), Signal-to-Noise Ratio (SNR) or similar metrics on each antenna for each User Equipment (UE) based on one or more received UL reference signals, and generates signal(s) to control the connection and switch network to connect the N RF paths to a set of the M antennas and/or to control the connection and switch network to connect a set of the M antennas to the N RF paths in a given time slot;
   wherein the connection and switch network further comprises a switch that switches between data transmission/reception mode and UL reference signal reception mode.

2. The base station of claim 1 wherein the EML is a spherical or planar lens.

3. The base station of claim 1 wherein the M antennas are arranged in a one-, two- or three-dimensional spherical or planar array.

4. The base station of claim 1 wherein the connection and switch network is controlled to switch each RF path to connect to a subset of antennas wherein any two antennas in the subset are separated by antennas that are in other subset(s) of antennas that are to be switched to connect to one or more other RF paths, and the processor unit controls the connection and switch network to adaptively switch each RF path to connect to one of the antennas in the subset in a given time slot.

5. The base station of claim 1 wherein the processor unit controls the connection and switch network to select the antenna(s) to connect to the RF paths based on the sum(s) of signal energy of reference signals from a plural of UEs received at the antenna(s) to serve the plural of UEs in a allocated time slot.

6. The base station in claim 1, wherein the connection and switch network further comprising a filter with a specific passband connected to each antenna in the UL reference signal reception mode to filter the received UL, reference signal before passing them to the RF path.

7. The base station of claim 6 wherein the BS allocates time slot(s) for one or more UEs to send one or more UL reference signals, the processor unit controls the connection and switch network to connect each antenna's received signal to the filter whose passband frequency is different from the other antennas connected to the same RF path, the BS extracts signals of each antenna from the signal received by the RF path using the corresponding passband frequency of the filter connected to the antenna, and estimates the RSS, SNR or similar metrics of the received UL reference signal from each UE on each antenna.

8. The base station of claim 7 wherein the BS determines which antenna is connected to an RF path and/or which RF path is turned on/off in the following time slot(s) based on the UEs scheduled for data transmission or reception in the time slot(s) and the RSS, SNR or similar metrics of the received UL reference signal from each of the scheduled UEs on each antenna.

9. The base station in claim 1 wherein the connection and switch network further comprising circuits that can connect m (1<m≤M) antennas to k (k<m) independent RF paths through an adaptively controlled RF switch on each antenna so that at most k of the m antennas are connected to the k RF paths and each antenna is connected to at most one RF path.

10. The base station in claim 1 wherein the processor extracts received UL reference signals on part of the frequency band used for signal transmission to measure RSS, SNR or similar metrics.

11. The base station in claim 1 wherein the processor unit determines the antennas that are connected to each RF paths and/or the antennas and/or the RF paths that are turned off in a data transmission time slot based on the scheduled UEs and the associated RSS, SNR or similar metrics of each UE's UL reference signal(s) on each antenna, and generates signals to control the connection and switch network.

12. A base station (BS) for wireless communication comprising
   an electromagnetic lens (EML) that produces different phase factors to uplink (UL) incident waves from the same direction;
   M antennas that receive and/or transmit signals that pass through the EML wherein the angles of arrival and/or departure of one or more User Equipment (UE) are mapped to a subset of m antennas with m≤M;

N (N≤M) radio frequency (RF) paths for transmitting and/or receiving;

a connection and switch network that maps the signals from the M antennas to the N RF paths in the uplink (UL) or maps the signals from the N RF path to the M antennas in the downlink (DL); and, a processor unit that measures or estimates a receiving signal strength (RSS), Signal-to-Noise Ratio (SNR) or similar metrics on each antenna for each User Equipment (UE) based on one or more received UL reference signals, and generates signal(s) to control the connection and switch network to map the signals from the N RF paths to the M antennas and/or to control the connection and switch network to map the signals from the M antennas to the N RF paths, wherein the RF path selection to map the signals from the M antennas to the N RF paths in the UL or to map the signals from the N RF path to the M antennas in the DL are predefined for Customer Premise Equipment (CPEs) in fixed wireless access wherein each predefined RF path selection produces a pattern of beams serving a subset of CPEs, the BS serves the CPEs using Time Division Multiple Access (TDMA) by selecting a RF path selection to serve a subset of CPEs in a given time slot.

13. A method for wireless communication comprising one or more user equipment (UE) transmitting one or more uplink (UL) reference signals in a time slot allocated by a base station (BS); the BS controlling a connection and switch network to switch to a UL signal reception mode; the BS measuring and estimating on each of its M antennas the received signal strength (RSS), Signal-to-Noise Ratio (SNR) or similar metrics based on the received UL reference signals from each UE; the BS determining the connections to connect which of the M antennas to which of N RFs where M≥N and which antennas and/or which RF paths are to be turned off in a following data transmission time slot based on the scheduled UEs and the associated estimate of the RSS, SNR or similar metrics of the received UL reference signal from each of the scheduled UEs on each antenna; and the BS controlling the connection and switch network to implement the connections and to switch to a data transmission/reception mode.

14. The method in claim 13 further comprising connecting to each antenna a filter whose passband is different from other antennas connected to the same RF path when the connection and switch network is switched to the UL reference signal reception mode; the BS extracts the signals of each antenna from the received UL reference signal using the frequency band specific to each of the antennas connected to the same RF path; and the BS measuring and estimating the RSS, SNR or similar metrics of the UL reference signal of an UE on each antenna using the extracted signal.

15. The method in claim 13 further comprising the BS controlling the connection and switch network to select the antenna(s) to connect to the RF paths based on the sum(s) of signal energy of reference signals from a plural of UEs received at the antenna(s) to serve the plural of UEs in the allocated time slot.

16. The method in claim 13 further comprising the BS serving a plural of Customer Premise Equipment (CPEs) using Time Division Multiple Access (TDMA) by controlling the connection and switch network to produce a pattern of beams serving a subset of CPEs in fixed wireless access at one time slot, and controlling the connection and switch network to produce another pattern of beams serving a different subset of CPEs in fixed wireless access at another time slot.

* * * * *